(12) United States Patent
Okazaki et al.

(10) Patent No.: US 6,550,782 B2
(45) Date of Patent: Apr. 22, 2003

(54) CYLINDER HEAD GASKET

(75) Inventors: Yoshimichi Okazaki, Okayama (JP); Takashi Nanba, Okayama (JP); Kenji Matsumoto, Okayama (JP); Yoshitaka Tanaka, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 09/893,623

(22) Filed: Jun. 29, 2001

(65) Prior Publication Data

US 2002/0000696 A1 Jan. 3, 2002

(30) Foreign Application Priority Data

Jun. 29, 2000 (JP) ........................................ 2000-195914

(51) Int. Cl.[7] ................................................ F02F 11/00
(52) U.S. Cl. ........................ 277/592; 277/590; 277/591; 277/594
(58) Field of Search ................................ 277/590, 591, 277/592, 594

(56) References Cited

U.S. PATENT DOCUMENTS 4,834,399 A * 5/1989 Udagawa et al. ........... 277/592
5,634,646 A * 6/1997 Miyaoh ...................... 277/592
5,700,016 A * 12/1997 Miyaoh et al. .............. 277/591
5,769,430 A * 6/1998 Udagawa .................... 277/592
5,893,566 A * 4/1999 Miyaoh et al. .............. 277/592
6,139,024 A * 10/2000 Yakushiji et al. ........... 277/592

* cited by examiner

Primary Examiner—Anthony Knight
Assistant Examiner—Enoch Peavey
(74) Attorney, Agent, or Firm—Wenderoth, Lind & Ponack, L.L.P.

(57) ABSTRACT

A cylinder head gasket adapted for being mounted on an internal combustion engine, and comprises an elastic metal sheet (1) having more than one combustion chamber opening and more than one passage hole, including a bead formed in the area surrounding the combustion chamber opening and a bead formed in the area surrounding the passage hole, wherein a sealing material is coated on the front or rear side, or both, of the elastic metal sheet (1). Specifically, the sealing material includes a thermally resistant sealing material (7, 17) and a water/oil resistant sealing material (8, 18), wherein the thermally resistant sealing material (7, 17) may be coated on the front or rear side, or both, of the bead (5) formed in the area surrounding the combustion chamber opening (2), and the water/oil resistant sealing material (8, 18) may be coated on the front or rear side, or both, of the bead (6) formed in the area surrounding the passage hole (3).

20 Claims, 4 Drawing Sheets

CYLINDER HEAD GASKET

BACKGROUND OF THE INVENTION

1. Field of the Invention

The present invention relates to a metallic gasket material that provides a base for making a cylinder head gasket adapted for use on the cylinder head of an internal-combustion engine or like gasoline engine mounted on an automotive vehicle, and more particularly to such a cylinder head gasket that comprises a thin spring steel sheet having beads formed thereon.

2. Description of the Prior Art

Typically, a conventional metal cylinder head gasket includes an elastic metal sheet having beads formed like projections or steps in cross section, wherein the said beads may serve to seal the joint surfaces between the cylinder head and cylinder block of an internal-combustion engine, for example. This gasket provides an effective means for sealing the joint, and has been employed for the practical use in the fields, such as the automobile engines. In general, the cylinder head gasket has a coating of an elastic sealing material containing a rubber material as a base component applied on the front side or rear side, or both, of the cylinder head gasket, as disclosed in Japanese patent application now laid open to public inspection under Japanese Patent Publication No. 63-A-96359. The coating of an elastic sealing material is provided to increase the sealing capability of the gasket.

For recent years, there have been demands for small-size, light-weight engines as well as for engines that produce less exhaust gases. For the small-size, light-weight engines, the engines might lose the mechanical rigidity by themselves, whereas for the less exhaust gas engines, the engines might produce higher temperatures. Thus, demands arise for cylinder head gaskets that address the above problems and solve them effectively.

For the engines that has the rigidity problem as firstly mentioned, using the conventional cylinder head gasket to close the cylinder block of the engine tightly would tend to cause the deformation on the cylinder block by the tightening action. This would make it difficult to apply the uniform tightening force to the cylinder head gasket to tighten the cylinder block.

For the engines that has the high temperature problem as secondly mentioned, there is a remarkable difference in the temperature between the exhaust port side and suction port side of the cylinder block, which would cause the thermal deformation to develop on the joint between the cylinder head and cylinder block. When the conventional cylinder head gasket is used on such engines, the part of the gasket that seals the joint between the cylinder head and cylinder block would develop a partial difference in the surface pressure upon the joint. If any excessive temperature differential should occur, the coating of the elastic sealing material including a rubber base on the cylinder head gasket would be degraded by the thermal effect, which would subject the coating of the sealing material to the stress relief. Thus, the restorability of the gasket required to seal the joint would be reduced considerably.

One possible solution to the above problem is to use the elastic sealing material that contains any rubber material that has the good thermal resistance, and to employ such elastic sealing material for the gasket. But, this would have the unfavorable effect of increasing the manufacturing cost and therefore the product cost, which is not desirable for the practical and commercial reasons.

SUMMARY OF THE INVENTION

The present invention addresses the problems of the conventional cylinder head gasket as described above, and provides a cylinder head gasket that solves both the rigidity problem of the engine itself and the high temperature problem of the engine in an effective manner.

Specifically, it is an object of the present invention to provide a cylinder head gasket when it is used to close the cylinder block of the engine, the uniform tightening force can be applied to the cylinder block and cylinder head by the said cylinder head gasket, while the said cylinder head gasket can provide the constant surface pressure even when it is exposed to the excessive temperature differential caused by the rising temperature within the engine, and can maintain the restorability and conformability of the gasket that are required to seal the cylinder head for a long time under such situations.

More specifically, the present invention proposes to provide a cylinder head gasket for an internal-combustion engine that comprises an elastic metal sheet having more than one combustion chamber openings or orifice and more than one passage hole, wherein the elastic metal sheet has a bead formed in the area surrounding the combustion chamber opening and a bead formed in the area surrounding the passage hole, respectively, and has a coating of a sealing material on the front side or rear side, or both, of the elastic metal sheet.

In order to overcome the problems described above, the cylinder head gasket according to the present invention has the following features that characterize the present invention, which will be described below.

One of the features is that the sealing material that may be used to form a coating layer on the front side or rear side, or both, of the bead formed in the area surrounding the combustion chamber openings includes any thermally resistant sealing material. Another feature is that the sealing material that may be used to form a coating layer on the bead formed in the area surrounding the passage holes includes any water/oil resistant sealing material.

In other words, the area surrounding the combustion chamber opening that is exposed to the high temperatures has a coating of the sealing material that can meet the requirements for the high temperature resistance, and the area surrounding the passage hole that is required to provide the high sealing capability against the water and/or oil have a coating of the sealing material that can meet the requirements for the water/oil resistance.

In the cylinder head gasket according to the present invention, the thermally resistant sealing material may be composed of a principal component of fluorine rubber, and any one or ones of the components consisting of expanded graphite, organic fiber, inorganic fiber, organic filler, inorganic filler, and synthetic resins.

The fluorine rubber is highly resistant to the heat, but is expensive. Thus, using lots of fluorine rubber would increase the manufacturing cost, which increases the product cost accordingly. In the cylinder head gasket according to the present invention, however, it may be appreciated from the foregoing description that the coating of the thermally resistant sealing material may only be applied to the bead formed in the area surrounding the combustion chamber openings that are exposed to the high temperatures in the combustion chamber, and that the said thermally resistant sealing material may be composed of the principal component of the fluorine rubber, and any one or ones of the components mentioned above. This can tend to maintain the highly thermal resistance of the sealing material while reducing the manufacturing cost.

In the cylinder head gasket of the present invention, the sealing material that provides the water and/or oil resistance may be composed of a rubber material, and any inorganic fiber or organic fiber.

In the cylinder head gasket of the present invention, the bead formed in the area surrounding the combustion chamber opening may preferably be formed like a full bead having the convex shape in cross section that can provide the spring action, since the area surrounding the combustion chamber opening is always exposed to the high temperatures and high pressures that are developed within the combustion chamber.

Similarly, the bead formed in the area surrounding the passage hole may preferably be formed like a half bead having the stepped shape in cross section that can provide the surface pressure adjusting function.

In the cylinder head gasket of the present invention, the bead formed in the area surrounding the combustion chamber opening may have a coating of the thermally resistant sealing material applied on both of the front and rear sides thereof. In this case, it is preferable to differ at least any one of parameters of the thermally resistant sealing material applied on the front side, such as the types of components, the composition ratio of components, the hardness, and the thickness of the thermally resistant sealing material applied on the front side, to that of the thermally resistant sealing material applied on the rear side.

This may also apply when the bead formed in the area surrounding the passage hole has a coating of the water/oil resistant sealing material applied on both of the front and rear sides thereof. At least any one of the parameters, such as the types of components, the composition ratio of components, the hardness, and the thickness of the water/oil resistant sealing material applied on the front side may be different from that of the water/oil resistant sealing material applied on the rear side.

Thus, the parameters such as the hardness and thickness of the coating of the sealing material to be applied, and the types and composition ratios of the components may be chosen differently for each of the front and rear sides, and the combination of the parameters chosen may be varied, depending on the respective requirements for each of the front and rear sides. In this way, according to the present invention, different cylinder head gaskets can be made in order to meet their respective different requirements.

It should be noted that the cylinder head gasket of the present invention may have a multiple construction that includes several cylinder head gaskets that are placed one over another like a stack, and may be mounted as a single unit on the engine such as the internal combustion engine.

According to the cylinder head gasket of the present invention, it may be appreciated that the coating of the sealing material that is applied on the bead formed in the area surrounding the combustion chamber opening that is exposed to the high temperatures and high pressures within the combustion chamber may have the appropriate properties to meet the particular requirements, and the coating of the sealing material that is applied on the bead formed in the area surrounding the passage hole that is required to provide the high sealing capability against the water and/or oil may also have the appropriate properties to meet the particular requirements. Furthermore, the bead formed in the area surrounding the combustion chamber opening and the bead formed in the area surrounding the passage holes may be formed into the appropriate shape to meet the particular requirements, respectively. The cylinder head gasket of the present invention that incorporates the features described above can solve the rigidity problem of the engine itself as well as the high temperature problem of the engine, and can be obtained at a reduced manufacturing cost.

More specifically, even if the cylinder block of the engine has been deformed, and the cylinder head gasket of the present invention is used to tighten the said deformed cylinder block, the uniform tightening force can be applied to the cylinder block and the cylinder head by the cylinder head gasket.

Even if the cylinder head gasket of the present invention is exposed to any excessive temperature differential that may be caused by the rising temperature within the combustion chamber, the part of the cylinder head gasket that seals the cylinder block can continue to exert the constant surface pressure upon the cylinder block. As the sealing material contains a rubber material having the appropriate properties to meet the respective requirements for the area of the elastic metal sheet on which the coating of such sealing material is applied, respectively, the cylinder head gasket thus obtained can provide the long-lasting restorability and conformability that are required to seal the cylinder block.

Although the sealing material used in the cylinder head gasket of the present invention contains the expensive fluorine rubber as the thermally resistant component, and is used to apply the coating to the elastic metal sheet, the coating of such sealing material may be limited to those regions that require the thermal resistance. Thus, the cylinder head gasket can he manufactured at the reduced costs and with the reduced size and weight.

DETAILS OF THE PREFERRED EMBODIMENTS

Now, the present invention will be described by referring to the accompanying drawings.

Figure 1:
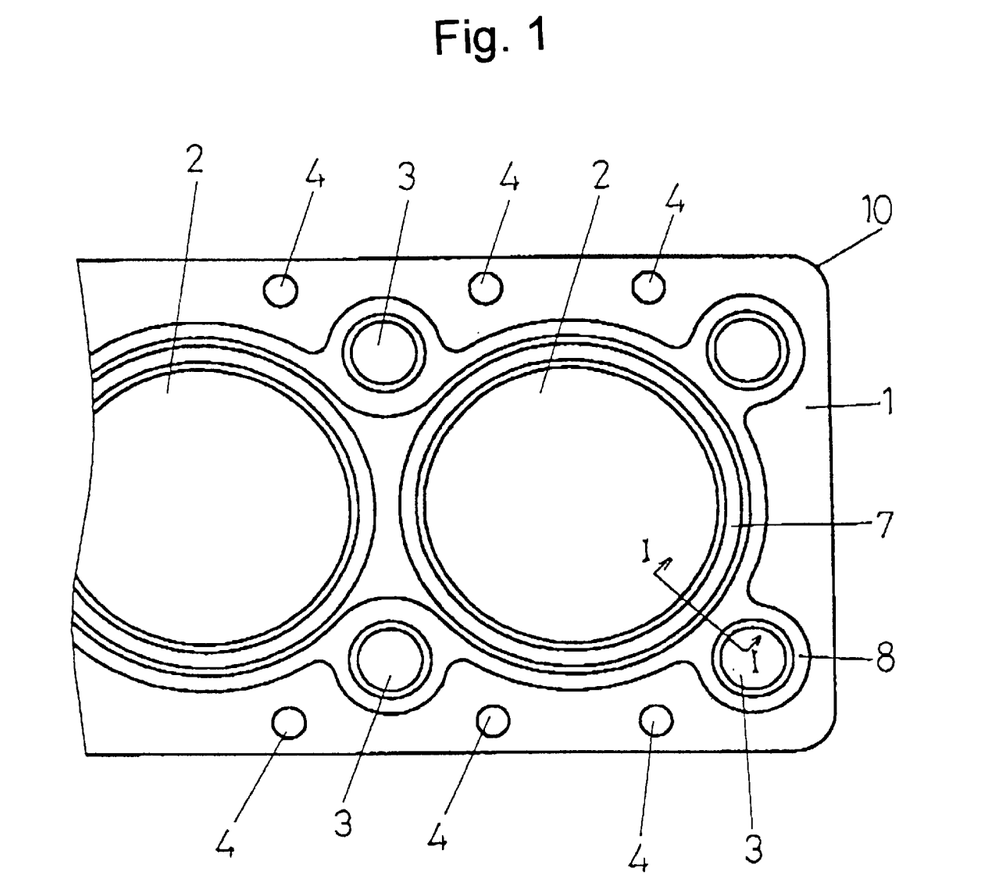
FIG. 1 is a plan view of a preferred embodiment of the present invention, with some parts are omitted and not shown.
Figure 2:
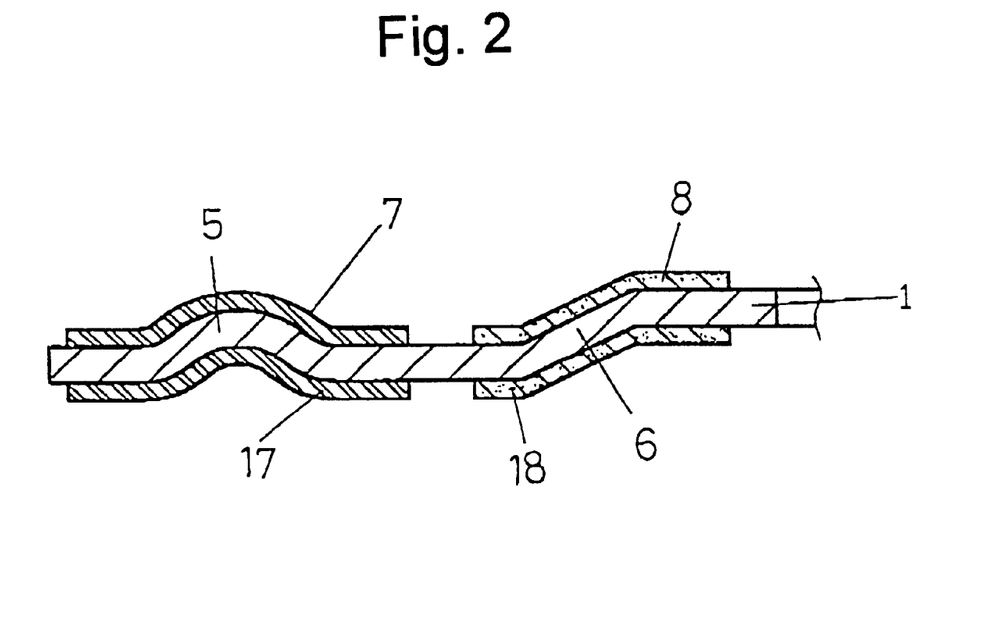
FIG. 2 is a sectional view taken along the line I—I in FIG. 1.

Referring to FIGS. 1 and 2, the cylinder head gasket 10 according to the present invention comprises an elastic metal sheet 1 having more than one combustion chamber opening 2, 2 and more than one passage hole 3, 3, 3, 3, wherein the elastic metal sheet 1 has beads 5, 6 formed in the area surrounding each respective combustion chamber opening 2 and in the area surrounding each respective passage hole 3, respectively, and a coating of the sealing material is applied to the front or rear side, or both, of the elastic metal sheet 1.

In the example shown in FIG. 2, the coating of the sealing material is applied to both of the front and rear sides of the elastic metal sheet 1. It may be noticed from FIG. 2 that the coating of the sealing material is only applied to the areas in which the beads 5, 6 are located. This serves to provide an easy understanding of the sealing material. If necessary, the coating of the sealing material may also be applied to other regions on the front and rear sides of the elastic metal sheet 1 than the regions where the beads 5, 6 are present. This may be performed in the same manner as for the regions where the beads 5, 6 are present.

The cylinder head gasket 10 according to the present invention may be mounted on the joint between the cylinder bead and cylinder block of an automobile engine such as the internal-combustion engine, for example. Although not shown in FIG. 2, for example, the cylinder head is located on the upper side, and the cylinder block is located on the lower side.

Each of the passage holes 3, 3 is usually used to allow water and/or oil to pass therethrough. The part identified by 4 in FIG. 1 represents a bolt hole.

In the cylinder head gasket 10 of the present invention, the coating that may be applied on the bead 5 in the area surrounding the combustion chamber opening 2 is the thermally resistant sealing material 7, 17, and the coating that may be applied on the bead 6 in the area surrounding the passage bole 3 is the water/oil resistant sealing material 8, 18.

Since the area surrounding the combustion chamber opening 2 is exposed to the high temperatures, and the passage hole 3 is usually provided to allow water and/or oil to pass therethrough, the area surrounding the combustion chamber opening 2 where the bead 5 is provided, and the area surrounding the passage hole 3 where the bead 6 is provided, should have the coating of the sealing material that contains the rubber material having the appropriate properties that meet the different requirements respectively for the areas at which beads 5, 6, are formed.

The thermally resistant sealing material 7, 17 should contain the fluorine rubber that has the good heat resistance as the principal component, and any one or ones of the components consisting of expanded graphite, organic fiber, inorganic fiber, organic filler, inorganic filler and synthetic resin.

The fluorine rubber is known as the thermally resistant component that can resist the heat in the range of between the normal temperature of 230° C. and the maximum temperature of 250° C., and has the property that allows it to be used as the coating material for the bead 5 in the area surrounding the combustion chamber opening 2 that is exposed to the high temperatures.

Although the fluorine rubber is expensive, the coating of the sealing material including the fluorine rubber may only be applied to the area where the bead 5 is located as described earlier, and the sealing material may be composed of the fluorine rubber as the principle component, and any one or ones of the components listed above. The cylinder head gasket that provides the good heat resistance can thus be obtained at a reduced manufacturing cost.

The expanded graphite, which is one of the components listed above, may be obtained by treating the high-purity natural graphite crystalline by using any chemicals such as concentrated sulfuric acid, and then subjecting the resulting product to the thermal treatment at the high temperatures above 1000° C. The final product can exhibit the high heat resistance when it is exposed to the temperature of 500° C. in the oxygen atmosphere, and when it is exposed to the temperature of 2000° C. in the non-oxygen atmosphere.

The organic fiber, which is also one of the components listed above, may include rock wool, aramid fiber, cellulose fiber, polyester fiber, polyamide fiber and the like. The inorganic fiber may include glass fiber, titanic acid potassium, and the like. The organic filler may include carbon black, and the inorganic filler may include silica, clay, calcium carbonate and the like. The synthetic resin may include polyamideimide, PTFE (polyetetrafluoroethylene) and the like.

When the thermally resistant sealing material 7, 17 is prepared, the preferred composition ratio of the fluorine rubber and any other components listed above should include 10 to 25% by weight of fluorine rubber relative to the other components. This composition ratio ensures that the thermally resistant sealing material 7, 17 can maintain the good thermal resistance provided by the fluorine rubber. It should be noted, however, that if the composition ratio is other than the before described preferred composition ratio, that is, if the composition proportion of the fluorine rubber is less than the composition proportion mentioned above, it would have the unfavorable effect on the bondage of the fluorine rubber, and if the composition proportion is greater, it would cause the fluorine rubber to provide the excessive conformability. Either case is not desirable.

As described above, the thermally resistant sealing material 7, 17 may be obtained by combining a principal component of fluorine rubber with any one or ones of the components listed earlier in order to permit the thermally resistant sealing material 7, 17 to maintain the good thermal resistance provided by the fluorine rubber and to reduce the manufacturing cost and the product cost. Therefore, any one or ones of the components listed above may be chosen optionally, and the composition ratio may be chosen optionally provided that the sealing material 7, 17 thus obtained can attain the before described objects and the proportion of the fluorine rubber is between 10% and 25% by weight. This may be done to meet the particular requirements for the cylinder head gasket.

For example, the thermally resistant sealing material 7, 17 may be obtained by combining the principal component, which is the fluorine rubber in this case, with other components such as expanded graphite, and organic fiber or inorganic fiber, or the combination of organic fiber and inorganic fiber. In this case, the composition ratio should preferably represent 10% to 25% by weight of fluorine rubber, 5% to 15% by weight of expanded graphite, and 60% to 85% by weight of organic fiber or inorganic fiber, or the combination of organic fiber and inorganic fiber. It should be noted that if the expanded graphite represents the proportion of less than the range specified above, it would not provide the required strength, while if it represents the proportion of greater than the above range, it would become too hard. Neither is desirable. It should also be noted that if the organic fiber and/or inorganic fiber represents the proportion of less than the range specified above, it would be dispersed poorly, while it represents the proportion of greater than the above range, however the thermal resistance may be improved, it would have the unfavorable effect on the workability. Thus, neither is desirable.

The water/oil resistant sealing 8, 18 is next described. Its basic object is to increase the sealing ability of the cylinder head gasket. As the cylinder head gasket includes the passage holes 3 that are usually used to allow water and/or oil to pass therethrough, the water/oil resistant sealing material 8, 18 may be obtained by combining the rubber material with any inorganic fiber or organic fiber.

Generally, the rubber material may be NBR (acrylonitrile butadiene rubber), but other components may also be used, such as acrylic rubber, silicone rubber, isoprene rubber, chloroprene rubber and the like.

The inorganic fiber may include any of the fibers such as glass, ceramic fiber, rock cotton, mineral wool, fused quartz, whisker, boron, carbon, and metal. It should be noted that asbestos are not included.

The organic fiber may include any of the fibers such as polyamide, polyolefin, polyester, polyacrylonitrile, and polyvinyl alcohol.

The composition ratio of any inorganic and/or organic fiber with regard to the rubber material may be determined so that the sealing material can provide the constant and stable sealing ability against water and/or oil. For example, the sealing material may be obtained by combining 10% to 40% by weight of rubber material with 60% to 90% by weight of inorganic and/or organic fiber. The composition proportion of the fibers (inorganic or organic) should preferably be more than 60% by weight, which would prevent the beads from flowing sideways or buckling in the event that the beads should be placed under any excessive stress. Otherwise, the composition proportion of the rubber material being less than 10% by weight would make it difficult for the rubber to provide the good bondage.

It should be noted that the coating of the thermally resistant sealing material 7, 17 on the region of the bead 5 and the coating of the water/oil resistant sealing material 8, 18 on the region of the bead 6 may be deposited effectively by using the masking process, or the printing molding process such as screen printing and transfer printing. This also permits the operation to be performed with ease. Any other known coating methods may be employed, as it is apparent to any persons skilled in the relevant art.

In the cylinder head gasket 10 according to the present invention, as described so far, the property of the sealing material applied and coated on the areas of beads 5 and 6 can meet the respective requirements for the each respective areas. That is, the sealing material for the bead 5, which is formed in the area surrounding the combustion chamber opening 2, has the property that can resist the high temperatures and high pressures to which it is exposed, and the sealing material for the bead 6, which is formed in the area surrounding the passage hole 3, has the property that can resist the water or oil, respectively, that passes through the respective passage holes.

Generally, the beads may be provided on the elastic metal sheet 1 to increase the local surface pressures due to the compression. In the present invention, the beads 5, 6 may preferably have the shape and structure that allow the respective beads to provide the desirable function and action, depending on the respective positions in which the respective beads are formed on the elastic metal sheet 1.

Specifically, the bead 5 provided in the area surrounding the combustion chamber opening 2 that is exposed to the high temperatures and high pressures may be formed as a full bead, which has the convex shape in cross section as shown in FIG. 2. This full bead can provide the spring property.

Similarly, the bead 6 provided in the area surrounding the passage hole 3 may be formed as a half bead, which has the stepped shape in cross section as shown in FIG. 2. This can provide the higher surface pressure adjusting function.

In the embodiment shown in FIG. 2, the bead 5 has the coating of the thermally resistant material 7, 17 applied on the front and rear sides thereof, respectively, and the bead 6 has the coating of the water/oil resistant sealing material 8, 18 applied on the front and rear sides thereof, respectively.

It can be altered that, for both of the beads 5, 6, the respective coating may be applied only on either of the front and rear sides.

In the embodiment shown in FIG. 2 wherein the coating of the thermally resistant sealing material 7, 17 is applied on both of the front and rear sides of the bead 5, respectively, the sealing material 7 can be different from the sealing material 17 such that at least one or more of the parameters such as the type of components, the composition ratio of the components, the hardness and the thickness of the sealing material 7 is different from that of the sealing material 17 on the rear sides of the bead 5, depending on the respective requirements for each of the front and rear sides.

Similarly, in the embodiment shown in FIG. 2 wherein the coating of the thermally resistant sealing material 8, 18 is applied on both of the front and rear sides of the bead 6, respectively, the sealing material 8 can be different from the sealing material 18 such that at least one or more of the parameters such as the type of components, the composition ratio of the components, the hardness and the thickness of the sealing material 8 is different from that of the sealing material 18 on the rear side of the bead 6, depending on the respective requirements for each of the front and rear sides.

In the embodiment in which the coating of the thermally resistant sealing material 7, 17 and the coating of the water/oil resistant material 8, 18 are applied on the front and rear sides of the respective beads 5, 6, respectively, a lot of combinations of the sealing materials on the front side and the respective rear side can be provided by making a difference between at least one or more of the parameters such as the type of components, the composition ratio of the components, the hardness and the thickness of the sealing material on the front side and that of the sealing material on the rear side. Thereby, it can provide a cylinder head gasket which has a suitable combination of the sealing materials on the front side and the respective rear side, both of which have suitable properties conforming with the particular requirements for each of the front side and rear side of cylinder head gasket.

The cylinder head gasket according to the present invention, which is shown in FIG. 2, has a single construction that includes a single cylinder head gasket whose structure has been described so far, and may be mounted on the internal-combustion engine.

Figure 3:
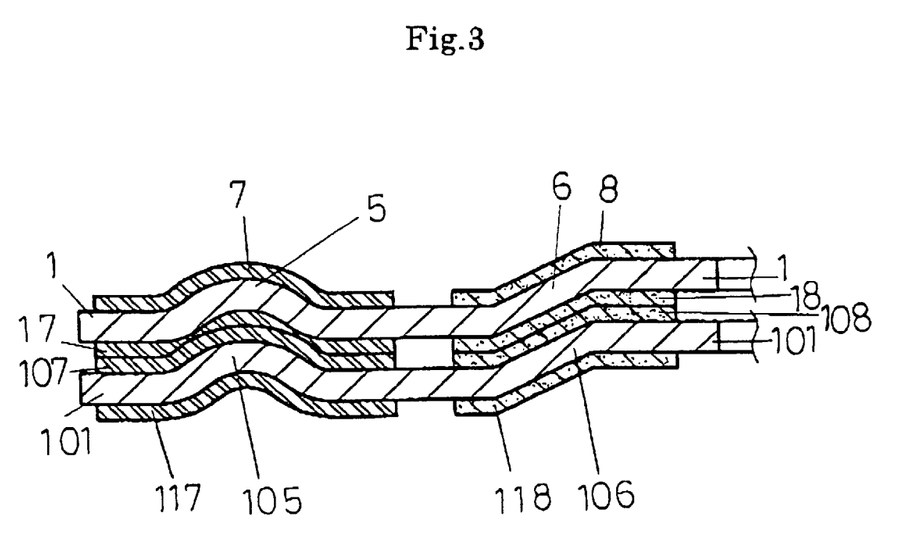
FIG. 3 is a sectional view of another preferred embodiment of the present invention, showing the parts corresponding to those shown in FIG. 2.
Figure 4:
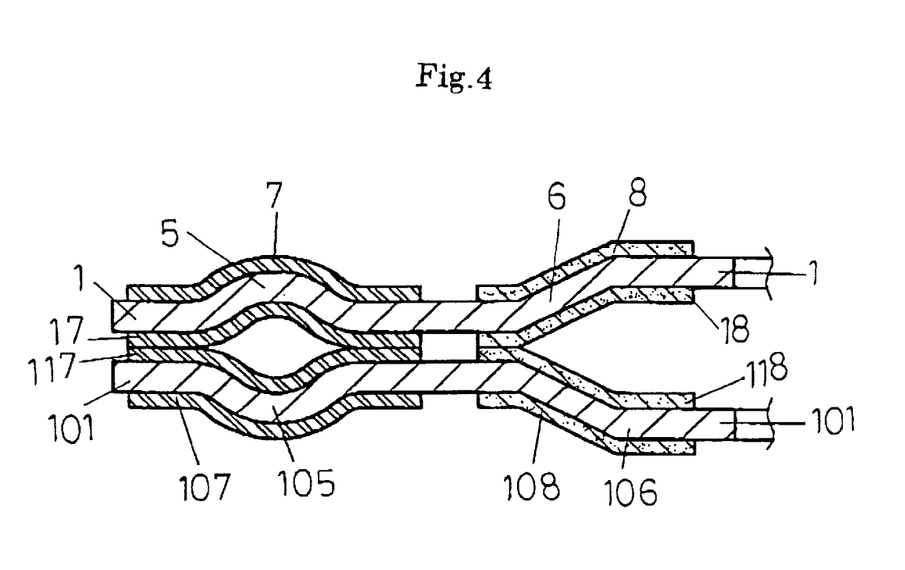
FIG. 4 is a sectional view of still another preferred embodiment of the present invention, showing the parts corresponding to those shown in FIG. 2.

FIGS. 3 and 4 show two alternative forms of the cylinder bead gasket shown in FIG. 2, respectively, each of which has a multiple-construction that includes several cylinder head gaskets each having the same structure as that shown in FIG. 2, and may be mounted as a single unit on the internal-combustion engine.

The cylinder head gasket of the present invention shown in FIG. 3 includes two cylinder head gaskets shown in FIG. 2 that are placed one over the other, and may be used as a single unit. The cylinder head gasket of the present invention shown in FIG. 4 includes two cylinder head gaskets shown in FIG. 2 that are placed opposite each other, and may be used as a single unit.

The cylinder head gaskets of the present invention shown in FIGS. 3 and 4, each of which has the multiple-construction, may provide the same function and effect as the cylinder head gasket shown in FIG. 2, which has the single construction.

In the cylinder head gasket shown in FIG. 3, the rear side of the elastic metal sheet 1 that forms the upper cylinder head gasket, for example, may be free of the thermally resistant sealing material 17 and water/oil resistant sealing material 18. Alternatively, the elastic metal sheet 1 that forms the upper cylinder head gasket may have the coating of the thermally resistant sealing material 17 and water/oil resistant sealing material 18 on the rear side thereof, while the front side of the elastic metal sheet 101 that forms the lower cylinder head gasket may be free of the thermally resistant sealing material 107 and water/oil resistant sealing material 108. The above may also apply to the cylinder head gasket shown in FIG. 4.

For an example, the cylinder head gasket according to the present invention may be produced by the following steps. Note that the following steps are described in connection with the embodiment shown in FIG. 2.

Firstly, a blank such as SUS, spring steel, SPCC and the like is formed into an elastic metal sheet 1 that is 0.1 to 0.5 mm thick, and has more than one combustion chamber openings 2, passage holes 3 and bolt holes 4, respectively, that may be formed in the usual manner. Then, a bead 5 in the form of a full bead having the convex shape in cross section is formed in area surrounding the respective combustion chamber openings 2, and a bead 6 in the form of a half bead having the stepped shape in cross section is formed in the area surrounding the respective passage holes 3.

Next, a thermally resistant sealing material 7, 17 is coated on the front side and rear side of the area in which the bead 5 is located. In this case, the thermally resistant sealing material may contain the particular composition ratio of the components, such as 20% by weight of fluorine rubber, 10% by weight of expanded graphite, 40% by weight of rock wool, and 30% by weight of polyester fiber, and may be obtained by mixing those components together The thermally resistant sealing material 7, 17 thus obtained may be applied on the front and rear sides by using the masking process, for example. The resulting coating layer on both sides has a thickness of 25 to 50 µm.

Also, a water/oil resistant sealing material 8, 18 is coated on the front side and rear side of the area in which the bead 6 is located. In this case, the water/oil resistant sealing material may contain the particular composition ratio of the components, such as 25% by weight of NBR, and 75% by weight of polyvinyl alcohol fiber, and may be obtained by mixing those components together. The water/oil resistant sealing material 8, 18 thus obtained may be applied on the front and rear sides by using the masking process, for example. The resulting coating layer on both sides has a thickness of 25 to 50 µm.

FIGS. 1 and 2 represents the cylinder head gasket of the present invention that has been produced in accordance with the before described steps.

Although the present invention has been described in particular reference to several preferred embodiments thereof, it should be understood that various changes and modifications may be made without departing from the spirit and scope of the invention as defined in the appended claims.

What is claimed is:

1. A cylinder head gasket adapted for being mounted on an internal combustion engine, comprising:
   a single elastic metal sheet having
   (i) at least one combustion chamber opening,
   (ii) at least one passage hole,
   (iii) a first bead in an area surrounding said at least one combustion chamber opening, said first bead having a front side and a rear side,
   (iv) a second bead in an area surrounding said at least one passage hole, said second bead having a front side and a second side,
   (v) a thermally resistant sealing material on at least one of said front side and said rear side of said first bead, and
   (vi) a water/oil resistant sealing material on at least one of said front side and said rear side of said second bead.

2. The cylinder head gasket according to claim 1, wherein said at least one combustion chamber opening comprises plural combustion chamber openings and said at least one passage hole comprises plural passage holes.

3. The cylinder head gasket according to claim 2, wherein said thermally resistant sealing material comprises a coating of said thermally resistant sealing material and said water/oil resistant sealing material comprises a coating of said water/oil resistant sealing material.

4. The cylinder head gasket according to claim 3, wherein said thermally resistant sealing material comprises a mixture of fluorine rubber as a principal component and at least one of expanded graphite, organic fiber, inorganic fiber, organic filler, inorganic filler and synthetic resin.

5. The cylinder head gasket according to claim 4, wherein said coating of said thermally resistant sealing material is on both of said front side and said rear side of said first bead, with said coating on said front side being different from said coating on said rear side with respect to at least one of
   (i) components of said mixture of said thermally resistant sealing material,
   (ii) a ratio of components of said mixture of said thermally resistant sealing material,
   (iii) hardness of said coating of said thermally resistant sealing material, and
   (iv) thickness of said coating of said thermally resistant sealing material.

6. The cylinder head gasket according to claim 4, wherein said mixture includes fluorine rubber in an amount of 10% to 25% by weight.

7. The cylinder head gasket according to claim 3, wherein said water/oil resistant sealing material comprises a mixture of rubber and inorganic fiber or a mixture of rubber and organic fiber.

8. The cylinder head gasket according to claim 7, wherein said coating of said water oil resistant sealing material is on both of said front side and said rear side of said second bead, with said coating on said front side being different from said coating on said rear side with respect to at least one of
   (i) components of said mixture of said water/oil resistant sealing material,
   (ii) a ratio of components of said mixture of said water/oil resistant sealing material,
   (iii) hardness of said coating of said water/oil resistant sealing material, and
   (iv) thickness of said coating of said water/oil resistant sealing material.

9. The cylinder head gasket according to claim 7, wherein said mixture of rubber and an inorganic fiber comprises from 10% to 40% by weight rubber and from 60% to 90% by weight inorganic fiber, and said mixture of rubber and an organic fiber comprises from 10% to 40% by weight rubber and from 60% to 90% by weight organic fiber.

10. The cylinder head gasket according to claim 3, wherein said first bead comprises a full bead having a convex cross-sectional shape and said second bead comprises a half bead having a stepped cross-sectional shape.

11. The cylinder head gasket according to claim 3, further comprising:

at least one additional single elastic metal sheet having
- (i) at least one combustion chamber opening,
- (ii) at least one passage hole,
- (iii) a first bead in an area surrounding said at least one combustion chamber opening, said first bead having a front side and a rear side,
- (iv) a second bead in an area surrounding said at least one passage hole, said second bead having a front side and a second side,
- (v) a thermally resistant sealing material on at least one of said front side and said rear side of said first bead, and
- (vi) a water/oil resistant sealing material on at least one of said front side and said rear side of said second bead, wherein said single elastic metal sheet and said at least one additional single elastic metal sheet are positioned one over another.

12. The cylinder head gasket according to claim 1, wherein said thermally resistant sealing material is different in composition relative to said water/oil resistant sealing material.

13. The cylinder head gasket according to claim 12, wherein said thermally resistant sealing material comprises a mixture of fluorine rubber as a principal component and at least one of expanded graphite, organic fiber, inorganic fiber, organic filler, inorganic filler and synthetic resin.

14. The cylinder head gasket according to claim 13, wherein said water/oil resistant sealing material comprises a mixture of rubber and inorganic fiber or a mixture of rubber and organic fiber, with said rubber being one of acrylonitrile butadiene rubber, acrylic rubber, silicone rubber and chloroprene rubber.

15. The cylinder head gasket according to claim 1, wherein said thermally resistant sealing material is on both of said front side and said rear side of said first bead, with said thermally resistant sealing material on said front side being different from said thermally resistant sealing material on said rear side with respect to at least one of
- (i) components of said thermally resistant sealing material,
- (ii) a ratio of components of said thermally resistant sealing material,
- (iii) hardness of said thermally resistant sealing material, and
- (iv) thickness of said thermally resistant sealing material.

16. The cylinder head gasket according to claim 1, wherein said water/oil resistant sealing material is on both of said front side and said rear side of said first bead, with said water/oil resistant sealing material on said front side being different from said water/oil resistant sealing material on said rear side with respect to at least one of
- (i) components of said water/oil resistant sealing material,
- (ii) a ratio of components of said water/oil resistant sealing material,
- (iii) hardness of said water/oil resistant sealing material, and
- (iv) thickness of said water/oil resistant sealing material.

17. A cylinder head gasket adapted for being mounted on an internal combustion engine, comprising:

an elastic metal sheet having
- (i) at least one combustion chamber opening,
- (ii) at least one passage hole,
- (iii) a first bead in an area surrounding said at least one combustion chamber opening, said first bead having a front side and a rear side,
- (iv) a second bead in an area surrounding said at least one passage hole, said second bead having a front side and a second side,
- (v) a thermally resistant sealing material on at least one of said front side and said rear side of said first bead, and
- (vi) a water/oil resistant sealing material on at least one of said front side and said rear side of said second bead wherein said thermally resistant sealing material is different in composition relative to said water/oil resistant sealing material.

18. The cylinder head gasket according to claim 17, wherein said thermally resistant sealing material comprises a mixture of fluorine rubber as a principal component and at least one of expanded graphite, organic fiber, inorganic fiber, organic filler, inorganic filler and synthetic resin.

19. The cylinder head gasket according to claim 18, wherein said water/oil resistant sealing material comprises a mixture of rubber and inorganic fiber or a mixture of rubber and organic fiber, with said rubber being one of acrylonitrile butadiene rubber, acrylic rubber, silicone rubber and chloroprene rubber.

20. The cylinder head gasket according to claim 17, wherein said water/oil resistant sealing material comprises a mixture of rubber and inorganic fiber or a mixture of rubber and organic fiber, with said rubber being one of acrylonitrile butadiene rubber, acrylic rubber, silicone rubber and chloroprene rubber.

\* \* \* \* \*